Figure 1:
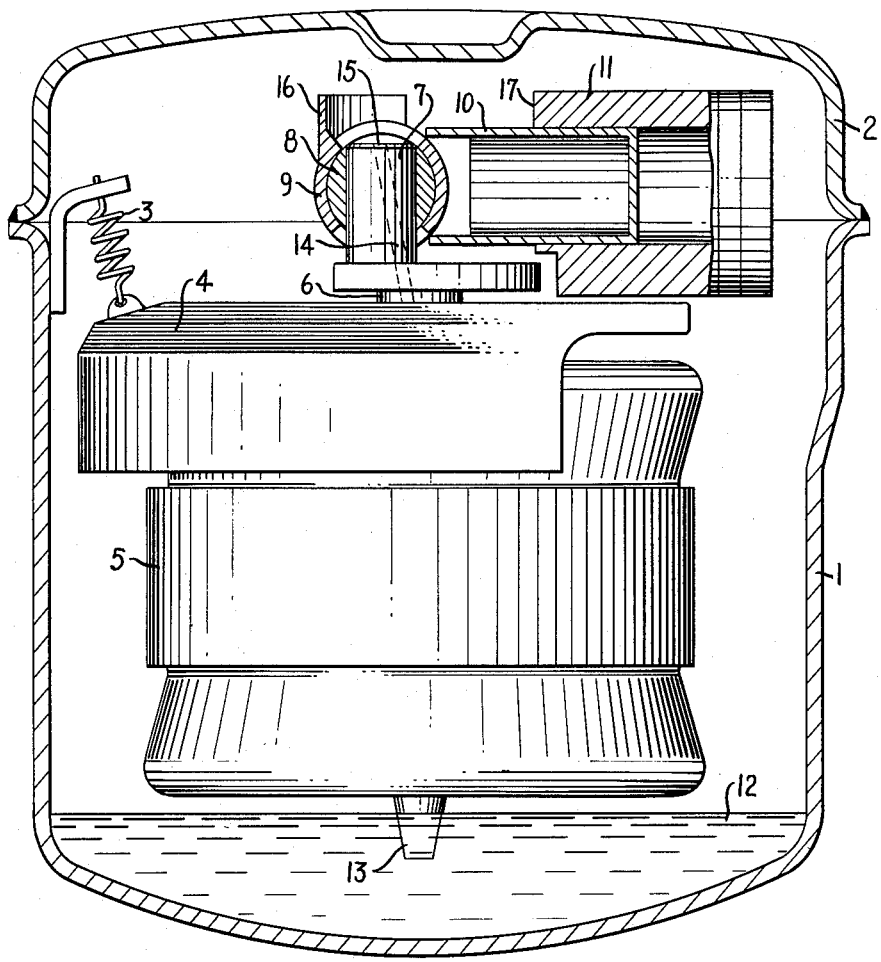

March 17, 1964 K. V. VALBJØRN 3,125,184
LUBRICATING DEVICE FOR A MOTOR COMPRESSOR
Filed Nov. 13, 1961

United States Patent Office 3,125,184
Patented Mar. 17, 1964

3,125,184
LUBRICATING DEVICE FOR A MOTOR
COMPRESSOR
Knud V. Valbjørn, Nordborg, Denmark, assignor to
Danfoss ved ing. M. Clausen, Nordborg, Denmark, a
company of Denmark
Filed Nov. 13, 1961, Ser. No. 151,781
Claims priority, application Germany Nov. 12, 1960
2 Claims. (Cl. 184—6)

The invention relates to a lubricating device for a motor compressor, particularly for motor compressors in hermetically-sealed refrigerating machines which are provided with an outlet for oil at the top of the crank pin between the motor and the compressor. Many motor compressors have a bore extending through the inside of the crank pin, and from the end of this bore the surplus oil, which is supplied in excess by the oil feeding system, escapes. As soon as the oil has reached the top of the crank pin, the oil is thrown out from the bore by centrifugal force because of the eccentric movement of the crank pin. There thus occurs a radial outwardly-directed or slightly helically deflected stream of oil.

In known constructions this surplus oil has returned directly to the oil supply zone if one of the components of the compressor, e.g. the cylinder, was not disposed in the oil stream to pick up part of the oil.

It is an object of this invention to provide means for facilitating the utilization of the surplus oil flowing from the top of the crank pin before it returns to the oil supply zone.

According to the invention, there is disposed an oil-collecting device on one of the parts driven by the crank pin and in the path of the stream of oil escaping from the outlet in the crank pin. The size or the length of the collecting device depends upon individual circumstances and particularly upon how much oil is to be utilized. Generally, it is desirable that the oil-collecting device cover at least 180° of the oil stream trajectory.

The escaping oil thus collected is utilized in various ways. First of all, the crank bearing can be flooded and throughly lubricated, and normal lubrication of the crank bearing might under certain circumstances not be necessary. In this connection, it is advantageous to have the oil collecting device, which is suitably in the form of a ridge or dam, mounted directly on the connecting rod bearing or the member connecting the piston to the crank pin. By means of a single dam, the oil can be collected in the area where it shortly thereafter is to be utilized again. Furthermore, the collected oil can be utilized for lubrication of the compressor piston. In this case, it is advantageous to place the oil collecting device on the side away from the piston.

Because of the piston motion, part of the collected oil, at each suction stroke, is led towards the cylinder. Such piston lubrication, therefore, does not require that the motor crankshaft be horizontal and that the piston be downwardly directed. The oil thus utilized for the piston lubrication and the oil picked up by the cylinder itself is, as a rule, sufficient for a complete lubrication of the piston.

Figure 2:
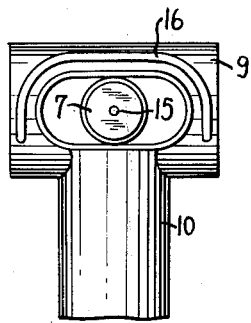
Figure 3:
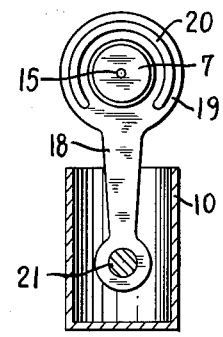

Other objects and features of the invention will be apparent from the following detailed description with particular reference to two embodiments taken with the accompanying drawing, wherein, FIG. 1 is a longitudinal cross-sectional view through the capsule of a motor compressor in which the motor and its support is shown from the side, the construction illustrated embodying features of the present invention;

FIG. 2 is a plan view of the connection between the crank pin and the piston, showing an oil-collecting device in accordance with the invention; and FIG. 3 is a similar plan view of another embodiment showing an oil-collecting device in combination with the connecting rod of a piston.

Referring to the drawing, in FIG. 1 is shown a motor compressor of the type commonly used for small refrigerating machines. The motor compressor is disposed in a housing 1 which is hermetically sealed by means of the cover 2. The motor compressor is fastened to the housing by means of springs 3 which engage the supporting device 4 of the motor 5. The driving shaft 6 drives the crank pin 7, which actuates the sliding block 8 of the connecting member 9 and thereby actuates the piston 10 which undergoes a reciprocating movement inside the cylinder 11 which is shown diagrammatically.

The moving parts are provided with an oil feeding system of conventional form which, from the oil reservoir 12 by means of a hollow conical part 13 of a centrifugal pump and under certain circumstances by means of other feeder elements (not shown), supplies various points of the motor compressor to be lubricated with oil. A bore 14 of the feeder system passes through the crank pin 7 and terminates in an outlet 15 at the top of the crank pin. Since this outlet 15 spins with a fixed radius around the centerline of the driving shaft 6, the oil which flows out of the outlet 15 is thrown out almost radially or in the form of a helical trajectory because of centrifugal force.

An oil collecting device in accordance with the invention and in the form of a dam or ridge 16 is mounted on the member connecting the piston to the crank pin. FIG. 2 shows that the ends of ridge 16 bends around the opening of the connecting member for the piston, so that an angle of approximately 200° of the trajectory of the oil stream is covered by the collecting device 16. The oil accumulating at the dam 16 floods the crank pin bearing and provides an effective lubrication of the crank bearing. The surface of the crank pin is somewhat set back in relation to the connecting member 9 so that a cup-like area is formed into which the oil can collect, which is of advantage particularly upon starting of the motor compressor. The excess oil which would otherwise not be utilized is thus effectively utilized in an improved manner. The oil which has been accumulated by the dam 16 also flows, partly assisted by the movement of the piston, towards the cylinder 11 and serves, in combination with the oil collected on the exterior side 17 of the cylinder, as a piston lubrication.

When the piston 10 is driven by a connecting rod 18, instead of by a member of the type shown in FIG. 2, the connecting rod bearing can, as shown in FIG. 3, be provided with an oil collecting device 20 in accordance with the invention, formed as a dam or ridge. The action of dam 20 is similar to that of the dam 16 shown in FIG. 2. Both the bearing of the connecting rod and the crank pin bearing can be lubricated by the thus-collected excess oil.

Instead of forming the dam or ridge directly on the connecting member for the piston as in FIGS. 1 and 2, or on the connecting rod bearing, as in FIG. 3, it can be provided on a plate or the like which can be welded or fastened in other manner to the connecting means. Without decreasing the function of the oil collecting device, it can also be placed near the piston, on the sliding block or on the connecting rod. If only the crank pin bearing is to be lubricated, the oil collecting device can cover the entire angle of 360° and be placed on the top of the crank pin. In addition to providing a lubricating effect, the surplus oil collected by the collecting device of this invention can also provide a cooling action on the associated surfaces.

As previously indicated, the motor and the compressor are of conventional construction and form no part of the present invention which is concerned with the lubricating system. A typical motor compressor in which the present invention may be embodied is described, for example, in United States Patent No. 2,312,596.

It will be understood that various changes and modifications may be made in the embodiment described above and illustrated in the drawings without departing from the scope of the invention as defined in the appended claims.

It is intended, therefore, that all matter contained in the foregoing description and in the drawings shall be interpreted as illustrative only and not as limitative of the invention.

I claim:

1. A lubricating device for a motor compressor of the type having a crank pin provided with an oil outlet at its top, a piston adapted to be reciprocated in response to circular movements of the crank pin, and connecting means surrounding said crank pin and freely receiving said pin and being movable with said pin to transfer the movements of said crank pin to said piston, said connecting means comprising a member rigidly connected to said piston, said lubricating device comprising an oil-collecting dam disposed on a surface of said connecting means, said oil collecting dam having a main body portion and side portions defining an enclosed area facing said pin, and being open in a direction towards said piston, and said dam being disposed on the portion of said surface on the side of said pin remote from said piston and being disposed to intercept the oil stream traveling in a trajectory from the oil outlet of the crank pin and thereby collect oil during movement of the crankpin and transfer said collected oil onto said piston in response to reciprocating travel of said piston and connecting means upon return movement from a top dead center position toward a bottom dead center position.

2. A lubricating device as defined in claim 1, wherein the oil-collecting dam covers an arc of at least 180° around the crank pin whereby to intercept at least 180° of the oil stream trajectory.

References Cited in the file of this patent

UNITED STATES PATENTS

| | | |
|---|---|---|
| 2,125,645 | Money | Aug. 2, 1938 |
| 2,130,862 | Steenstrup | Sept. 20, 1938 |
| 2,500,751 | Halfvarson | Mar. 14, 1950 |